United States Patent
Ghosh et al.

(10) Patent No.: US 11,056,909 B2
(45) Date of Patent: *Jul. 6, 2021

(54) DC UPS ARCHITECTURE AND SOLUTION

(71) Applicant: SCHNEIDER ELECTRIC IT CORPORATION, Foxboro, MA (US)

(72) Inventors: Rajesh Ghosh, West Bengal (IN); Damir Klikic, Waltham, MA (US); Mahendrakumar Haribhau Lipare, Bangalore (IN); Mudiyula Srikanth, Bangalore (IN)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 234 days.

This patent is subject to a terminal disclaimer.

(21) Appl. No.: 16/025,285

(22) Filed: Jul. 2, 2018

(65) Prior Publication Data

US 2020/0006974 A1 Jan. 2, 2020

(51) Int. Cl.
*H02J 9/06* (2006.01)
*H02M 7/217* (2006.01)
(Continued)

(52) U.S. Cl.
CPC ............ *H02J 9/062* (2013.01); *H02J 7/0068* (2013.01); *H02J 7/02* (2013.01); *H02M 1/4258* (2013.01);
(Continued)

(58) Field of Classification Search
CPC .. H02J 7/0068; H02J 7/02; H02J 9/062; H02J 9/06; H02J 9/067; H02M 3/33569;
(Continued)

(56) References Cited

U.S. PATENT DOCUMENTS 4,916,329 A * 4/1990 Dang .................. G05F 1/24
307/66
9,837,855 B2 * 12/2017 Prakash .................. H02J 9/062
(Continued)

FOREIGN PATENT DOCUMENTS

DE 4342327 A1 * 7/1994 .............. H02J 9/062
DE 4342327 A1 7/1994
(Continued)

OTHER PUBLICATIONS

Extended European Search Report from corresponding European Application No. 19181937.4 dated Nov. 4, 2019.

*Primary Examiner* — Rexford N Barnie
*Assistant Examiner* — Elim Ortiz
(74) *Attorney, Agent, or Firm* — Lando & Anastasi, LLP

(57) ABSTRACT

According to one aspect, a DC power supply is provided. The power supply includes a first input configured to be coupled to an AC power source, a second input configured to be coupled to a battery, an output, a transformer, and a controller coupled to the transformer. The transformer includes a first winding configured to be coupled to the first input, a second winding configured to be coupled to the second input, and a third winding configured to be coupled to the output. The controller controls, in a first mode, the first winding to generate, based on power received from the AC power source, a first voltage across the second winding to charge the battery, and a second voltage across the third winding, and control, in a second mode, the second winding to generate, based on power received from the battery, a third voltage across the third winding.

19 Claims, 13 Drawing Sheets

(51) Int. Cl.
*H02M 3/335* (2006.01)
*H02M 1/42* (2007.01)
*H02J 7/00* (2006.01)
*H02J 7/02* (2016.01)

(52) U.S. Cl.
CPC ... *H02M 3/33523* (2013.01); *H02M 3/33569* (2013.01); *H02M 7/217* (2013.01); *H02J 9/06* (2013.01)

(58) Field of Classification Search
CPC .............. H02M 1/4258; H02M 7/217; H02M 3/33523; H02M 7/02
See application file for complete search history.

(56) References Cited

U.S. PATENT DOCUMENTS

| | | | |
|---|---|---|---|
| 9,871,409 B2 * | 1/2018 | Ghosh | H02J 9/00 |
| 2007/0044539 A1 | 3/2007 | Sabol et al. | |
| 2010/0060081 A1 * | 3/2010 | Cheong | H02J 2207/40 307/66 |
| 2013/0106613 A1 | 5/2013 | Lee et al. | |
| 2014/0222521 A1 | 8/2014 | Chait | |
| 2015/0134761 A1 | 5/2015 | Sharma et al. | |
| 2016/0141951 A1 | 5/2016 | Mao et al. | |
| 2018/0048183 A1 * | 2/2018 | Heidenreich | G01R 31/392 |

FOREIGN PATENT DOCUMENTS

| | | |
|---|---|---|
| DE | 102009007737 A1 | 8/2010 |
| EP | 2728735 A2 | 5/2014 |
| EP | 3005512 A1 | 4/2016 |
| WO | 2018112663 A1 | 6/2018 |

* cited by examiner

DC UPS ARCHITECTURE AND SOLUTION

BACKGROUND

1. Field of Invention

The present invention relates generally to DC power supplies.

2. Discussion of Related Art

Power devices such as Uninterruptible Power Supplies (UPSs) are often used to provide regulated, uninterrupted power for sensitive and/or critical loads, such as computer systems and other data processing systems. Conventional UPSs include online UPSs, offline UPSs, line interactive UPSs, as well as others. Online UPSs typically provide conditioned, power-factor-corrected AC power as well as back-up AC power upon interruption of a primary source of AC power. Offline UPSs typically do not provide conditioning of input AC power, but do provide back-up AC power upon interruption of the primary AC power source. Line interactive UPS s are similar to offline UPSs in that they switch to battery power when a power event occurs but also typically include a multi-tap transformer for regulating the output voltage provided by the UPS.

SUMMARY

At least one aspect of the disclosure is directed to a DC power supply. The power supply includes a first input configured to be coupled to an AC power source, a second input configured to be coupled to a battery, an output, a transformer, and a controller coupled to the transformer. The transformer includes a first winding configured to be coupled to the first input, a second winding configured to be coupled to the second input, and a third winding configured to be coupled to the output. The controller controls, in a first mode, the first winding to generate, based on power received from the AC power source, a first voltage across the second winding to charge the battery, and a second voltage across the third winding, and control, in a second mode, the second winding to generate, based on power received from the battery, a third voltage across the third winding.

In one embodiment, the power supply includes a flyback converter coupled to the second input and coupled to the second winding. In some embodiments, the flyback converter includes a switch coupled to the controller and coupled in series with the second winding. In at least one embodiment, the controller is further configured to sense a current through the second winding and the switch, and generate a current feedback signal indicative of the sensed current. In one embodiment, the controller is configured to operate, in the second mode of operation, the switch to control the current through the second winding to generate the third voltage across the third winding.

In some embodiments, the controller is configured to operate the switch based on the current feedback signal. In at least one embodiment, the power supply includes a plurality of second windings, each second winding of the plurality of second windings being coupled to a respective flyback converter configured to be coupled to a respective battery. In one embodiment, the power supply includes a plurality of first windings, each first winding of the plurality of first windings being configured to be coupled to a respective AC power source.

In at least one embodiment, the power supply includes a switch coupled to the controller and coupled in series with the first winding, wherein the controller is configured to sense, in the first mode of operation, a first parameter indicative of the first voltage and a second parameter indicative of the second voltage, and operate, in the first mode of operation based on the first and second parameters, the switch to control current through the first winding to generate the first voltage, generate the second voltage, and provide power factor correction at the first input.

According to one aspect of the disclosure, a method of supplying DC power to a load is provided. The method includes acts of receiving, by a transformer in a first mode of operation, AC power from an AC power source, providing, by the transformer in the first mode of operation, a first portion of DC power derived from the AC power to a battery coupled to the transformer, providing, by the transformer in the first mode of operation, a second portion of DC power derived from the AC power to an output, receiving, by the transformer in a second mode of operation, DC power from the battery, and providing, by the transformer in the second mode of operation, output power derived from the DC power to the output.

In one embodiment, the method includes an act of sensing, in the second mode of operation, a property of the DC power received from the battery. In some embodiments, the method includes an act of generating, based on the sensed property of the DC power, a feedback signal indicative of the DC power. In at least one embodiment, the method includes an act of controlling, in the second mode of operation, the DC power provided to the transformer based on the feedback signal.

In some embodiments, controlling, in the second mode of operation, the DC power provided to the transformer includes controlling an output voltage of the power provided to the output. In at least one embodiment, providing, in the first mode of operation, the first portion of DC power derived from the AC power to the battery includes providing the first portion of DC power derived from the AC power to a plurality of batteries.

In some embodiments, the method includes acts of sensing, in the first mode of operation, a first parameter indicative of the first portion of the DC power and a second parameter indicative of the second portion of the DC power, modulating, in the first mode of operation, the first portion of the DC power and the second portion of the DC power based on the first parameter and the second parameter, and providing, in the first mode of operation, power factor correction at an input receiving the AC power.

In at least one embodiment, receiving, in the first mode of operation, the AC power from the AC power source includes receiving the AC power from a plurality of AC power sources. In one embodiment, the method includes an act of selecting, in the first mode of operation, a highest-priority AC source of the AC power source from which to receive the AC power, and selecting, in the second mode of operation, a highest-priority DC source from the battery from which to receive the DC power.

According to at least one aspect of the disclosure, a DC power supply is provided. The power supply includes a first input configured to be coupled to an AC power source, a second input configured to be coupled to a battery, an output, and means for providing, in a first mode of operation, a first winding to generate, based on AC power received from the AC power source, a first voltage across a second winding to charge the battery, and a second voltage across a third winding, and for controlling, in a second mode of operation, the second winding to generate, based on power received from the battery, a third voltage across the third winding. In one embodiment, the power supply includes a plurality of second windings, each second winding of the plurality of second windings being coupled to respective means for enabling, in the second mode of operation, each second winding to generate, based on power received from the battery, the third voltage across the third winding.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
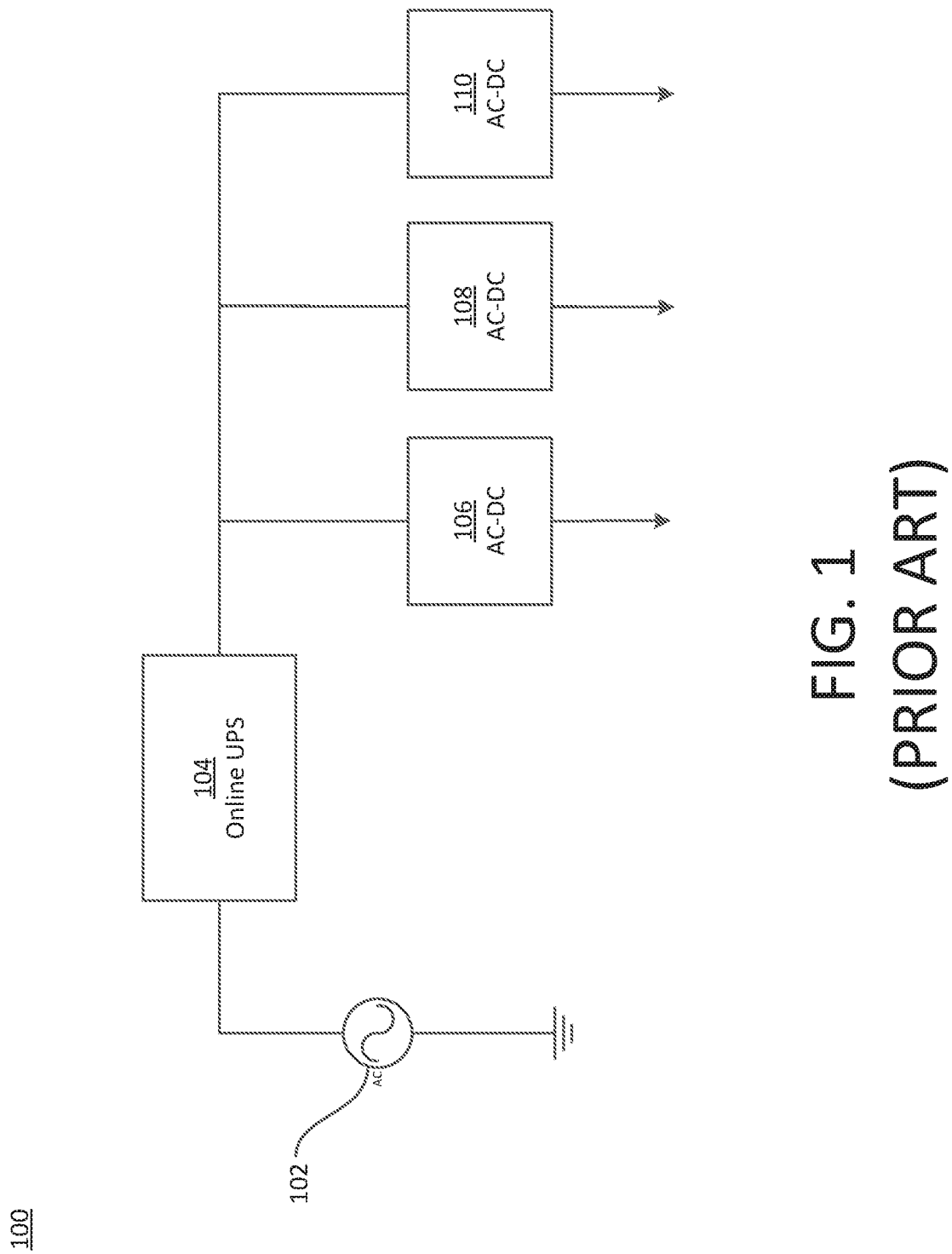
FIG. 1 is a block diagram of a conventional power supply architecture.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

AC-DC power supplies are used in a variety of applications where DC power is required, such as in automation panels. Automation panels can be used in process industries to feed necessary DC bias power of various voltage levels to electronic subsystems including Programmable Logic Controllers (PLCs), digital displays, communication systems, Digital Signal Processor (DSP)/Field-Programmable Gate Array (FPGA)/Microcontroller control cards, sensors, actuators, cooling systems, relays drives, and so forth.

Typical AC-DC power supplies employ a front-end diode-bridge rectifier, which draws current from an AC power source. This can be problematic because low-quality power drawn from the AC power source can adversely impact power factor, and conventional AC-DC power supplies are not power factor corrected. When a plurality of conventional AC-DC power supplies are connected in parallel, the effect of such low-quality power is multiplied, and significant input current distortions can arise. Furthermore, because conventional AC-DC power supplies do not typically have a power back-up feature, power supply can be unreliable, which can be unacceptable for critical systems (i.e., systems which are considered particularly important). To address the foregoing concerns, several conventional solutions illustrated in FIGS. 1-3 have typically been employed.

FIG. 1 illustrates a conventional AC-DC power supply architecture 100. The conventional AC-DC power supply architecture 100 includes an online UPS 104, a first AC-DC converter 106, a second AC-DC converter 108, and a third AC-DC converter 110, where the online UPS 104 is configured to be coupled to an AC power source 102. Each of the converters 106-110 is configured to be coupled to, and configured to provide power to, a respective load. The converters 106-110 can be implemented as Switch-Mode Power Supplies (SMPSs) and can each provide DC power to the respective load with the same or a different voltage level as one another, including 5 V, 12 V, 24 V, as well as other voltages. The online UPS 104 provides backed-up power to the converters 106, 108, and 110, ensuring that power is continuously provided to the loads coupled to the converters 106, 108, and 110, and also provides Power Factor Correction (PFC) for the converters 106, 108, and 110.

Figure 2:
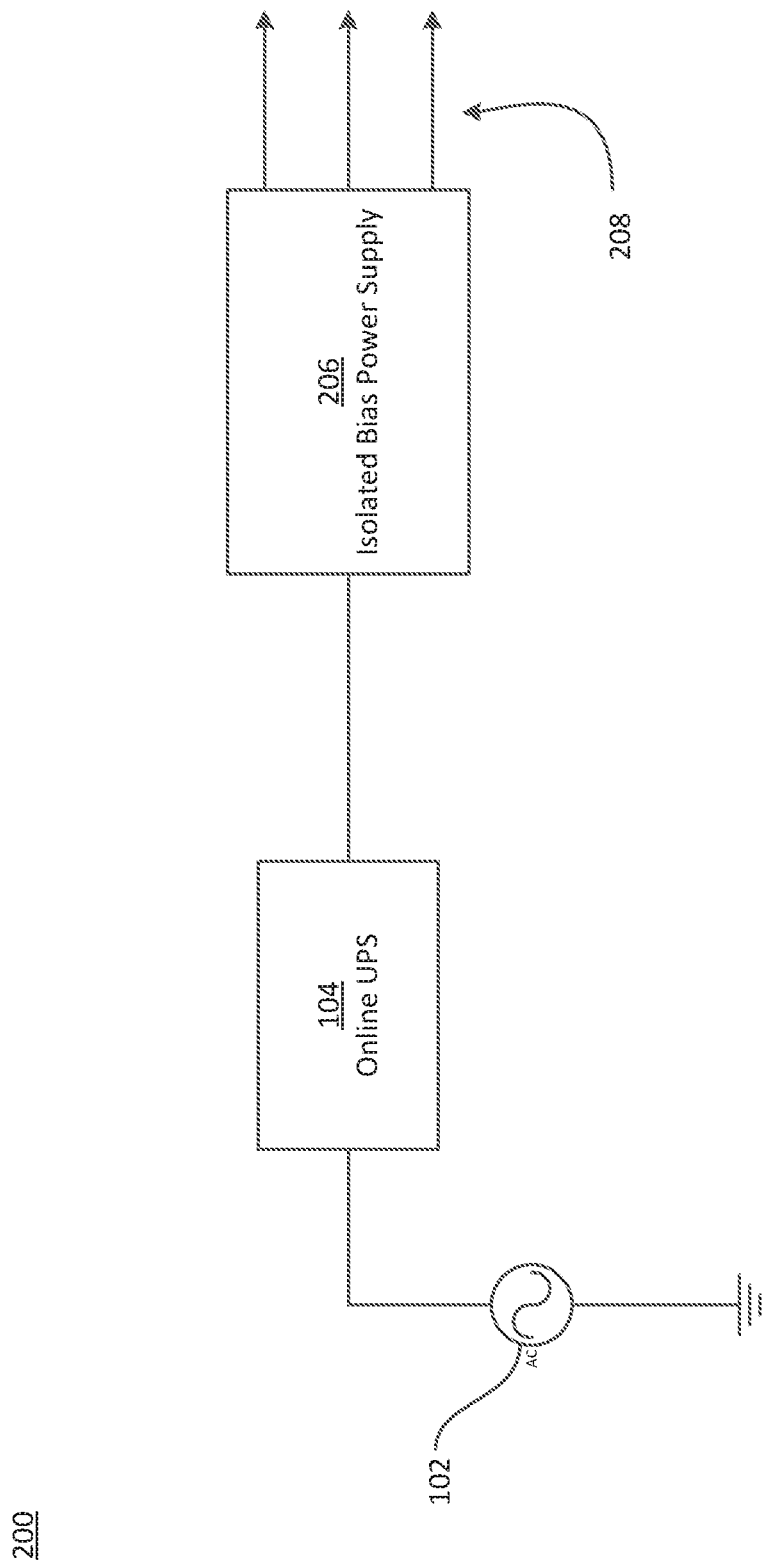
FIG. 2 is a block diagram of a conventional power supply architecture.

FIG. 2 illustrates another conventional AC-DC power supply architecture 200. The architecture 200 includes the online UPS 104 and an isolated DC power supply 206 having a plurality of outputs 208 each coupled to a respective load, where the online UPS 104 is configured to be coupled to an AC power source 102. FIG. 2 is substantially identical to FIG. 1, except that the converters 106-110 are replaced by the single isolated DC power supply 206. The isolated DC power supply 206 receives backed-up, power-factor-corrected power from the online UPS 104 and provides output power having various voltage levels to the plurality of outputs 208. For example, a first output of the plurality of outputs 208 can provide DC power having a voltage level of 5 V, a second output of the plurality of outputs 208 can provide DC power having a voltage level of 12 V, as well as other outputs providing other voltages.

Figure 3:
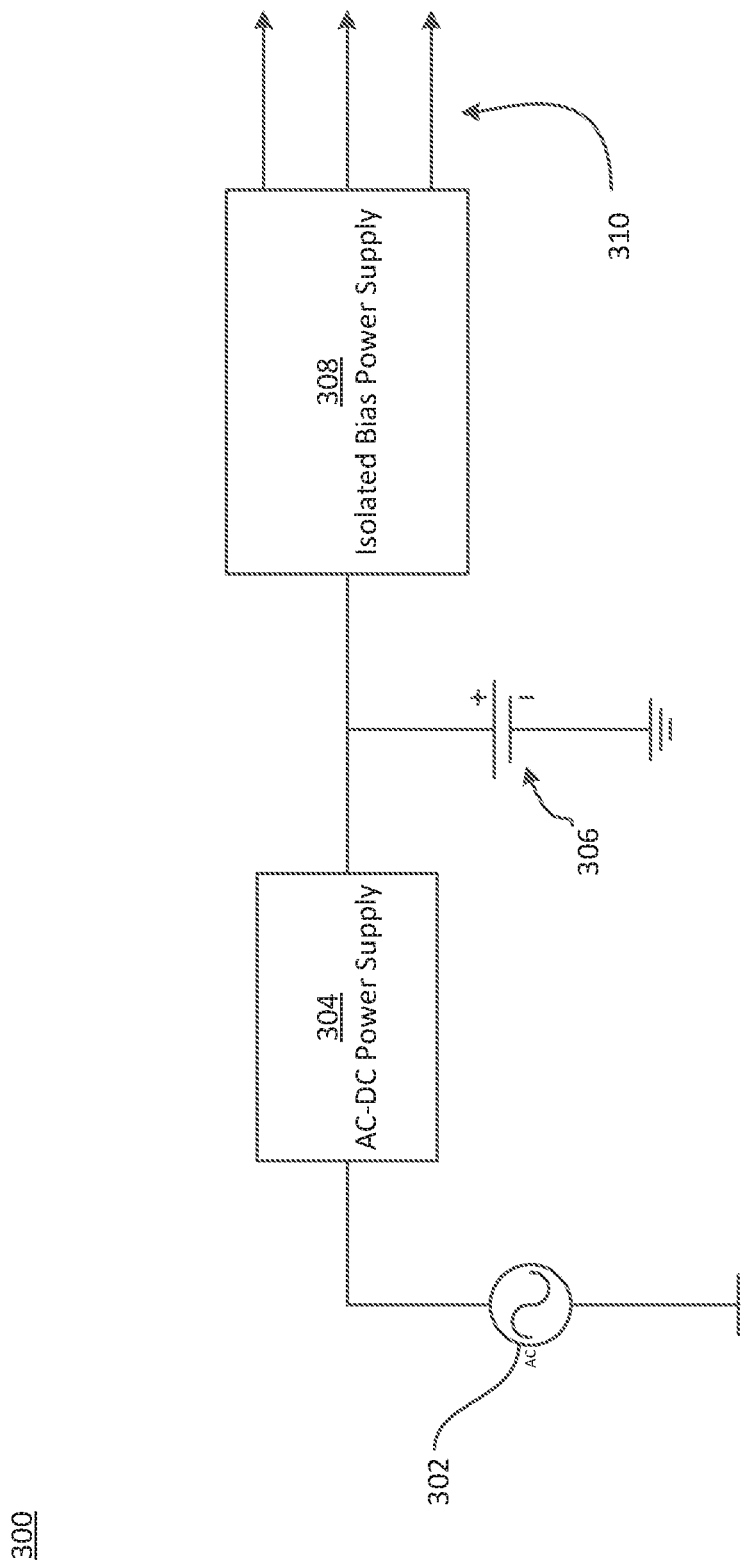
FIG. 3 is a block diagram of a conventional power supply architecture.

FIG. 3 illustrates another conventional AC-DC power supply architecture 300. The architecture 300 includes an AC-DC power supply 304, a battery 306, and an isolated DC power supply 308 having a plurality of outputs 310 each coupled to a respective load, where the AC-DC power supply 304 is configured to be coupled to the AC power source 302. The AC-DC power supply 304 receives AC power from the AC power source 302, converts the received AC power to DC power, and charges the battery 306 using the DC power. The battery 306 provides stored DC power to the isolated DC power supply 308, similar to the operation of a DC UPS.

Each of the foregoing conventional architectures shown in FIGS. 1-3 relies on the implementation of an external back-up power supply, such as a UPS, to provide back-up power when power supplied by a primary power supply is not acceptable. Acceptable power can be defined as power having parameters that are within established thresholds. For example, power can be considered acceptable if a voltage value of the power is within a threshold deviation from a nominal voltage.

However, the implementation of an external back-up power supply, such as a UPS, can suffer from several disadvantages. For example, UPSs often use mechanical relays to switch between primary and back-up power. Power is not provided to a connected load while the mechanical relay is actuating, which may be unacceptable where a connected load cannot sustain an interruption in power for the length of time required for the mechanical relay to actuate. An electrolytic capacitor can be connected to an output of the UPS to provide power to the connected load while the mechanical relay actuates to address the foregoing issue; however, electrolytic capacitors are typically large, expensive, and require frequent replacement.

Moreover, the addition of any type of front-end UPS can introduce higher costs, lower power conversion efficiency and reliability due to the inclusion of multiple cascaded power conversion stages, and lower power density because of the physical footprint of the UPS. Furthermore, some types of UPSs, such as offline and line interactive UPSs, do not offer PFC functionality which may be problematic where PFC is desired or necessary.

A relatively simple and inexpensive AC-DC power supply is provided that includes PFC and power back-up functionality without requiring the use of a UPS. In at least one embodiment, the AC-DC power supply includes at least two parallel power processing channels connected to one or more outputs through a multi-winding transformer. Examples provided herein can offer backed-up, power-factor-corrected power at a lower cost than conventional solutions with a higher power density, in part by obviating the need for an expensive external UPS.

Figure 4:
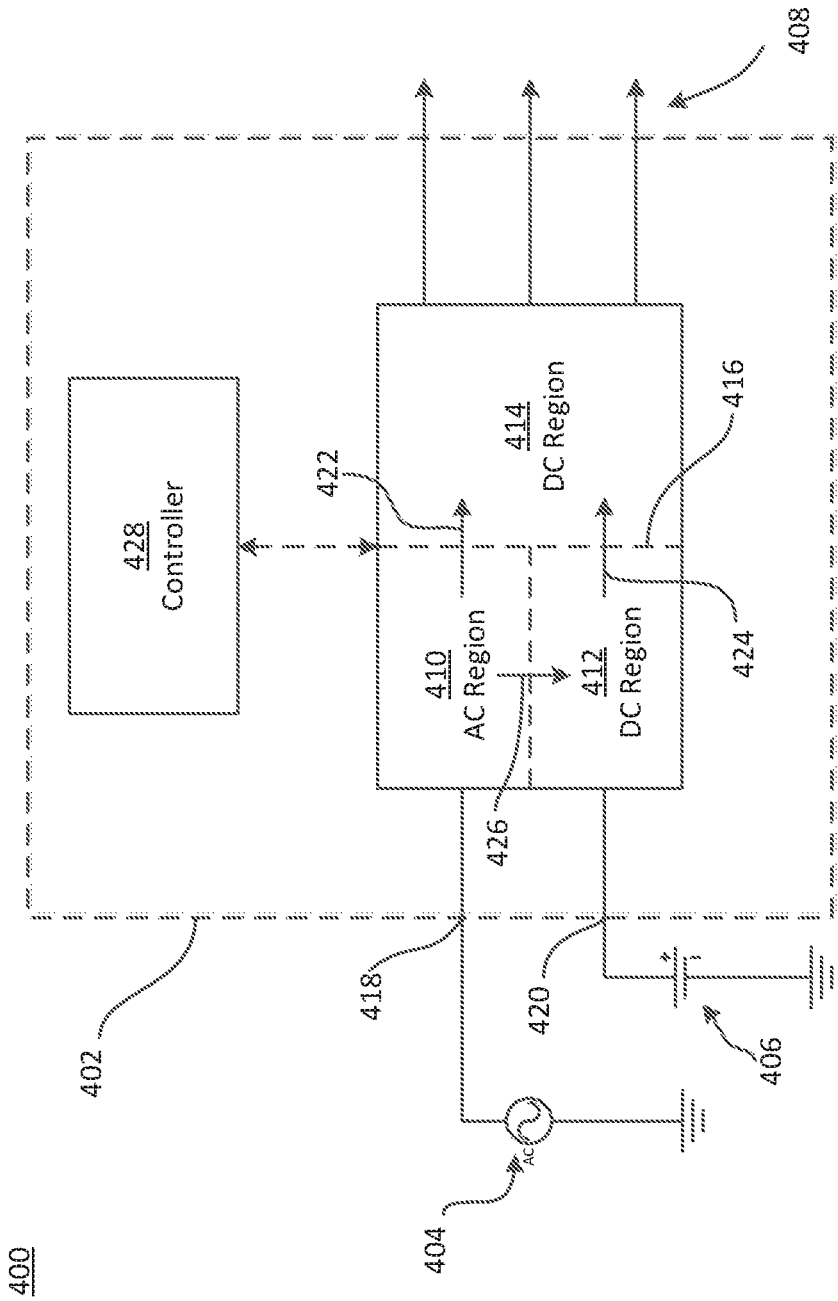
FIG. 4 is a block diagram of a power supply system according to aspects described herein.

FIG. 4 illustrates a block diagram of an AC-DC power supply system 400 according to at least one embodiment described herein. The power supply system 400 includes a power supply 402 configured to be coupled to a power source 404 (e.g., an AC mains source) and a DC battery 406. The power supply 402 includes a plurality of outputs 408, an AC processing region 410, a first DC processing region 412, a second DC processing region 414, an isolation barrier 416, a first input 418, a second input 420, a first power processing channel 422, a second power processing channel 424, a charging channel 426, and a controller 428.

The first input 418 is configured to be coupled to the AC power source 404. The second input 420 is configured to be coupled to the DC battery 406. The plurality of outputs 408 are configured to be coupled to one or more loads. The AC processing region 410, the first DC processing region 412, and the second DC processing region 414 are electrically isolated from one another by the isolation barrier 416. The AC processing region 410 is connected to the first DC processing region 412 via the charging channel 426, and is connected to the second DC processing region 414 via the first power processing channel 422. The first DC processing region 412 is connected to the second DC processing region 414 via the second power processing channel 424. The controller 428 is communicatively coupled to the AC processing region 410, the first DC processing region 412, and the second DC processing region 414. In some embodiments, the power supply 402 and the controller 428 are physically separate entities that are communicatively coupled to one another.

The AC power source 404 provides AC power to the first input 418. The controller 428 monitors the power provided by the AC power source 404 to the first input 418 to determine whether the power provided by the AC power source 404 is acceptable, as discussed above. In response to determining that the power provided by the AC power source 404 is acceptable, the controller 428 controls the AC processing region 410 to process the power provided by the AC power source 404. For example, the AC processing region 410 can be operated by the controller 428 to condition and/or modulate the power provided to the AC processing region 410 by the AC power source 404 to generate first processed power. The first processed power is provided from the AC processing region 410 to the first DC processing region 412 via the charging channel 426, and to the second DC processing region 414 via the first power processing channel 422.

The first DC processing region 412 receives the first processed power from the AC processing region 410 via the charging channel 426, filters and/or modulates the first processed power to generate second processed power according to control signals provided by the controller 428, and provides the second processed power to the DC battery 406 to charge the DC battery 406. The second DC processing region 414 receives the first processed power from the AC processing region 410 via the first power processing channel 422, filters the first processed power to generate third processed power according to control signals provided by the controller 428, and provides the third processed power to the plurality of outputs 408.

If the controller 428 determines that the power provided by the AC power source 404 to the first input 418 is not acceptable, the controller 428 controls the first DC processing region 412 to receive battery power from the DC battery 406 and to process the battery power received from the DC battery 406. For example, the first DC processing region 412 can be controlled by the controller 428 to condition and/or modulate the battery power provided by the DC battery 406 to generate fourth processed power. The fourth processed power is provided to the second DC processing region 414 via the second power processing channel 424. The second DC processing region 414 receives the fourth processed power via the second power processing channel 424, filters the fourth processed power to generate fifth processed power according to control signals provided by the controller 428, and provides the fifth processed power to the plurality of outputs 408.

Figure 5:
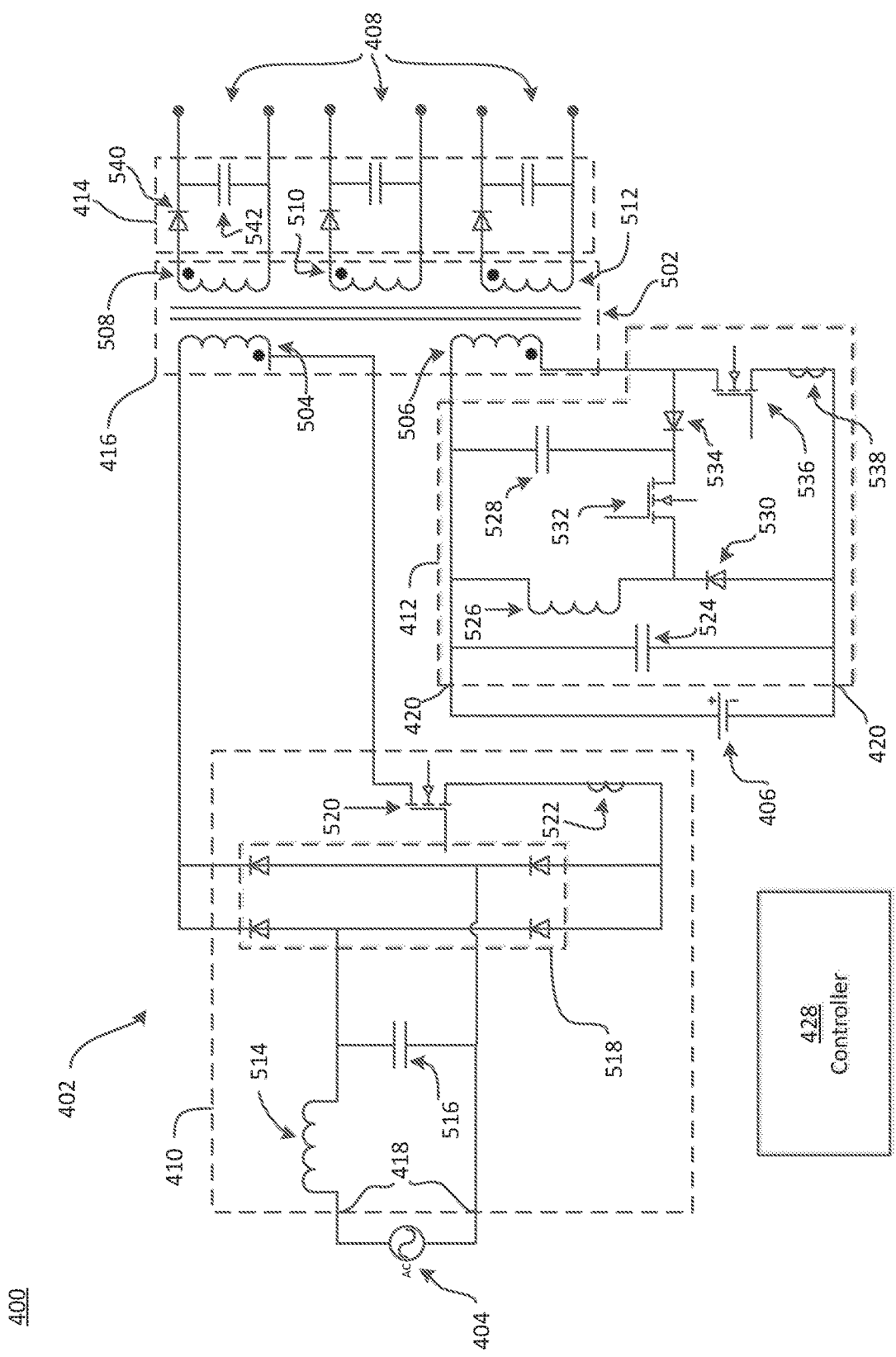
FIG. 5 is a circuit diagram of a power supply system according to aspects described herein.

FIG. 5 illustrates a circuit-level diagram of the power supply system 400 according to at least one embodiment, where the power supply 402 is implemented using a multi-winding isolated flyback converter topology. The power supply system 400 is realized around the isolation barrier 416, which includes a transformer 502 having a first winding 504, a second winding 506, a third winding 508, a fourth winding 510, and a fifth winding 512.

The AC processing region 410 includes an inductor 514, a capacitor 516, a full-wave rectifier 518, a switch 520, and a current transformer 522. The inductor 514 and the capacitor 516 are configured as an LC filter having a first connection configured to be coupled to the AC power source 404 and a second connection coupled to the full-wave rectifier 518. The full-wave rectifier 518 has a first connection connected to the LC filter, a second connection coupled to the first winding 504, and a third connection coupled to the current transformer 522. The first winding 504 has a first connection coupled to the full-wave rectifier 518 and a second connection connected to the switch 520. The switch 520 has a first connection coupled to the first winding 504 and a second connection coupled to the current transformer 522. The current transformer 522 has a first connection coupled to the switch 520 and a second connection coupled to the full-wave rectifier 518.

The inductor 514 and the capacitor 516 filter the AC power received from the AC power source 404 and the full-wave rectifier 518 rectifies the AC input voltage. The switch 520 modulates the current passing through the first winding 504 in response to control signals received from the controller 428. The current transformer 522 measures the current passing through the first winding 504 to provide a current feedback signal to the controller 428.

The first DC processing region 412 includes a capacitor 524, an inductor 526, a capacitor 528, a diode 530, a switch 532, a diode 534, a switch 536, and a current transformer 538. The capacitor 524 is configured to be coupled in parallel with the DC battery 406, and has a first connection coupled to the inductor 526, the capacitor 528, and the second winding 506 and a second connection coupled to the diode 530 and the current transformer 538. The inductor 526 has a first connection and a second connection. The first connection of the inductor 526 is coupled to the capacitor 524, the capacitor 528, and the second winding 506, and is configured to be coupled to the DC battery 406. The second connection of the inductor 526 is coupled to the switch 532 and the diode 530. The capacitor 528 has a first connection coupled to the inductor 526, the second winding 506, and the capacitor 524, and configured to be coupled to the DC battery 406, and a second connection coupled to the switch 532 and the diode 534.

The cathode of the diode 530 is coupled to the inductor 526 and the switch 532, and the anode of the diode 530 is coupled to the capacitor 524 and the current transformer 538 and is configured to be coupled to the DC battery 406. The switch 532 has a first connection coupled to the inductor 526 and the diode 530, and a second connection coupled to the capacitor 528 and the diode 534. The cathode of the diode 534 is coupled to the switch 532 and the capacitor 528 and the anode of the diode 534 is coupled to the second winding 506 and the switch 536.

The switch 536 has a first connection coupled to the second winding 506 and the diode 534 and a second connection coupled to the current transformer 538. The current transformer 538 has a first connection and a second connection. The first connection of the current transformer 538 is coupled to the switch 536. The second connection of the current transformer 538 is coupled to the capacitor 524 and the diode 530 and is configured to be coupled to the DC battery 406. The second winding 506 has a first connection coupled to the capacitor 524, the inductor 526, and the capacitor 528, and configured to be coupled to the DC battery 406, and a second connection coupled to the diode 534 and the switch 536.

The diode 534 and the capacitor 528 operate in combination as a snubber for the second winding 506. The switch 532, the inductor 526, and the diode 530 form a buck-boost converter which behaves as a regenerative snubber when the second winding 506 is in a flyback mode of operation. The switch 536 modulates the current passing through the second winding 506 in response to control signals from the controller 428. The current transformer 538 measures the current passing through the switch 536 to provide a current feedback signal to the controller 428.

The third winding 508, the fourth winding 510, and the fifth winding 512 are each coupled to a diode and a capacitor. For example, the third winding 508 is coupled to an output diode 540 and an output capacitor 542. The third winding 508 has a first connection coupled to the diode 540 and a second connection coupled to the capacitor 542 and configured to be coupled to an output. The diode 540 has a first connection coupled to the third winding 508 and a second connection coupled to the capacitor 542 and configured to be coupled to an output. The capacitor 542 has a first connection coupled to the diode 540 and configured to be coupled to an output, and a second connection coupled to the third winding 508 and configured to be coupled to an output. The fourth winding 510 and the fifth winding 512 are coupled to similar components and behave similarly, although different output power may be provided to each of the plurality of outputs 408. For example, output power provided by the third winding 508 may have a different voltage rating than the output power provided by the fourth winding 510 and the fifth winding 512.

Operation of the power supply 402 will now be described in greater detail. Two modes of operation are illustrated, a first mode being characterized by the AC power provided by the AC power source 404 being acceptable and a second mode being characterized by the AC power provided by the AC power source 404 not being acceptable.

In the first mode, the power supply 402 is configured to operate in a normal mode of operation in response to receiving acceptable AC power from the AC power source 404, where the AC power source 404 may be, for example, an AC mains power supply. The first winding 504 behaves as a primary winding and the other windings 506-512 behave as secondary windings. The AC power received by the AC processing region 410 from the AC power source 404 is filtered by the inductor 514 and the capacitor 516, rectified by the full-wave rectifier 518, and provided to the first winding 504.

The first winding 504 is connected in series with the switch 520, which controls the current through the first winding 504. The switch 520 is driven with sine-modulated Pulse Width Modulation (PWM) signals provided by the controller 428 to achieve PFC at the AC input, and to modulate the voltage generated across the windings 506-512. The controller 428 provides the PWM signals based at least in part on current feedback signals provided by the current transformer 522.

Based on the switching of the switch 520, a voltage is generated across the first winding 504, and an induced voltage is generated across the second winding 506, the third winding 508, the fourth winding 510, and the fifth winding 512 through the transformer 502. The voltage generated across the second winding 506 is provided to the DC battery 406 to charge the DC battery 406 via a conductive path including the second winding 506, the DC battery 406, the current transformer 538, and the switch 536. The voltage generated across the third winding 508, the fourth winding 510, and the fifth winding 512 is provided to a respective output of the plurality of outputs 408.

Operation of the transformer 502 will now be described in greater detail using the first winding 504 and the third winding 508 as an example. When the switch 520 is closed and conducting, rectified AC mains current passes through the first winding 504. The AC mains current passing through the first winding 504 induces a magnetic field in the first winding 504, thereby storing magnetic energy in the transformer 502.

While the rectified AC mains current is passing through the first winding 504, the voltage at the non-dotted terminal of the first winding 504 is positive relative to the voltage at the dotted terminal of the first winding 504. As indicated by the reverse polarity of the third winding 508 (i.e., the opposite dot polarity), a voltage is induced at the non-dotted terminal of the third winding 508 which is positive relative to the voltage at the dotted terminal of the third winding 508. Accordingly, the voltage at the anode of the diode 540 is negative relative to the voltage at the cathode of the diode 540, and the diode 540 is in a reverse-biased mode. While the diode 540 is in a reverse-biased mode, and the diode 540 prevents any appreciable current through the diode 540, the third winding 508, and the capacitor 542.

When the switch 520 is subsequently opened and stops conducting, rectified AC mains current through the first winding 504 stops. A negative voltage is induced on the non-dotted terminal of the first winding 504 relative to the dotted terminal of the first winding 504 as a result of the cessation of AC mains current through the first winding 504. The negative voltage across the first winding 504 induces a negative voltage across the third winding 508 (i.e., the voltage at the non-dotted terminal of the third winding 508 is negative relative to the voltage at the dotted terminal of the third winding 508). The voltage at the anode of the diode 540 is therefore positive relative to the voltage of the cathode of the diode 540, which renders the diode 540 in a forward-biased mode. The magnetic energy previously stored in the transformer 502 is released as current through the third winding 508, and current is provided to a respective output of the plurality of outputs 408.

The number of coils in the third winding 508 can be selected to provide output power having a desired output voltage to the respective output of the plurality of outputs 408, and as discussed above, the switch 520 can be controlled to modulate the output power around the desired output level. The fourth winding 510 and the fifth winding 512 behave similarly, and can be designed with a desired number of coils, which may be the same as or different than the number of coils in the third winding 508.

In the second mode, the AC power provided by the AC mains 404 is not acceptable and the power supply 402 enters a back-up mode. In the back-up mode, the DC battery 406 applies a voltage across the second winding 506, which behaves as a primary winding. The first winding 504, the third winding 508, the fourth winding 510, and the fifth winding 512 behave as secondary windings. However, no appreciable current passes through the first winding 504 because the full-wave rectifier 518 is in a reverse-biased state and because the switch 520 is maintained in an open and non-conducting state in the back-up mode.

The switch 536 controls the current through the second winding 506. Because the second winding 506 behaves as a primary winding to the secondary windings 508-512 of the transformer 502, the switch 536 indirectly controls the voltage generated across the secondary windings 508-512 of the transformer 502. The switch 536 is driven with sine-modulated PWM signals provided by the controller 428 to modulate the voltage generated across the secondary windings 508-512. The PWM signals may be generated based on current feedback signals provided by the current transformer 538.

The switch 536 is driven between a closed and conducting state and an open and non-conducting state. When the switch 536 is closed and conducting, the DC battery 406 provides current through the second winding 506 to drive the second winding 506 and induce magnetic energy in the transformer 502. When the switch 536 is open and non-conducting, the diode 534 and the capacitor 528 behave as a snubber for the second winding 506 to store energy discharged during flyback. The buck-boost converter formed by the switch 532, the inductor 526, and the diode 530 act as a regenerative snubber to provide the electrical energy stored in the capacitor 528 to the DC battery 406. The DC battery 406 continues to apply a voltage across the second winding 506 until the AC power at the AC power source 404 returns to an acceptable level, or until the DC battery 406 is depleted.

Similar to the first mode described above, where the first winding 504 induces magnetic energy in the transformer 502 when the switch 520 is closed and conducting, the second winding 506 induces magnetic energy in the transformer 502 when the switch 536 is in a closed and conducting state. Similarly, when the switch 536 is open and non-conducting, the magnetic energy previously stored in the transformer 502 is released through the third winding 508 and output current is provided to the plurality of outputs 408.

Variations of the topology discussed above with respect to FIG. 5 are intended to be within the scope of this disclosure. For example, in some embodiments, the current transformer 522 and the current transformer 538 may be omitted. Furthermore, in some embodiments, a diode may be implemented having an anode coupled to the switch 536 and a cathode coupled to the second winding 506. The diode can prevent a body diode in the switch 536 from becoming unintentionally forward-biased, which can detrimentally result in an unintended inrush of current through the second winding 506.

In the foregoing examples, the power supply 402 has been illustrated as having a single input DC converter embodying the first DC processing region 412. However, alternate embodiments are contemplated wherein a power supply is provided with multiple input DC converters managed by a main controller.

Figure 6A:
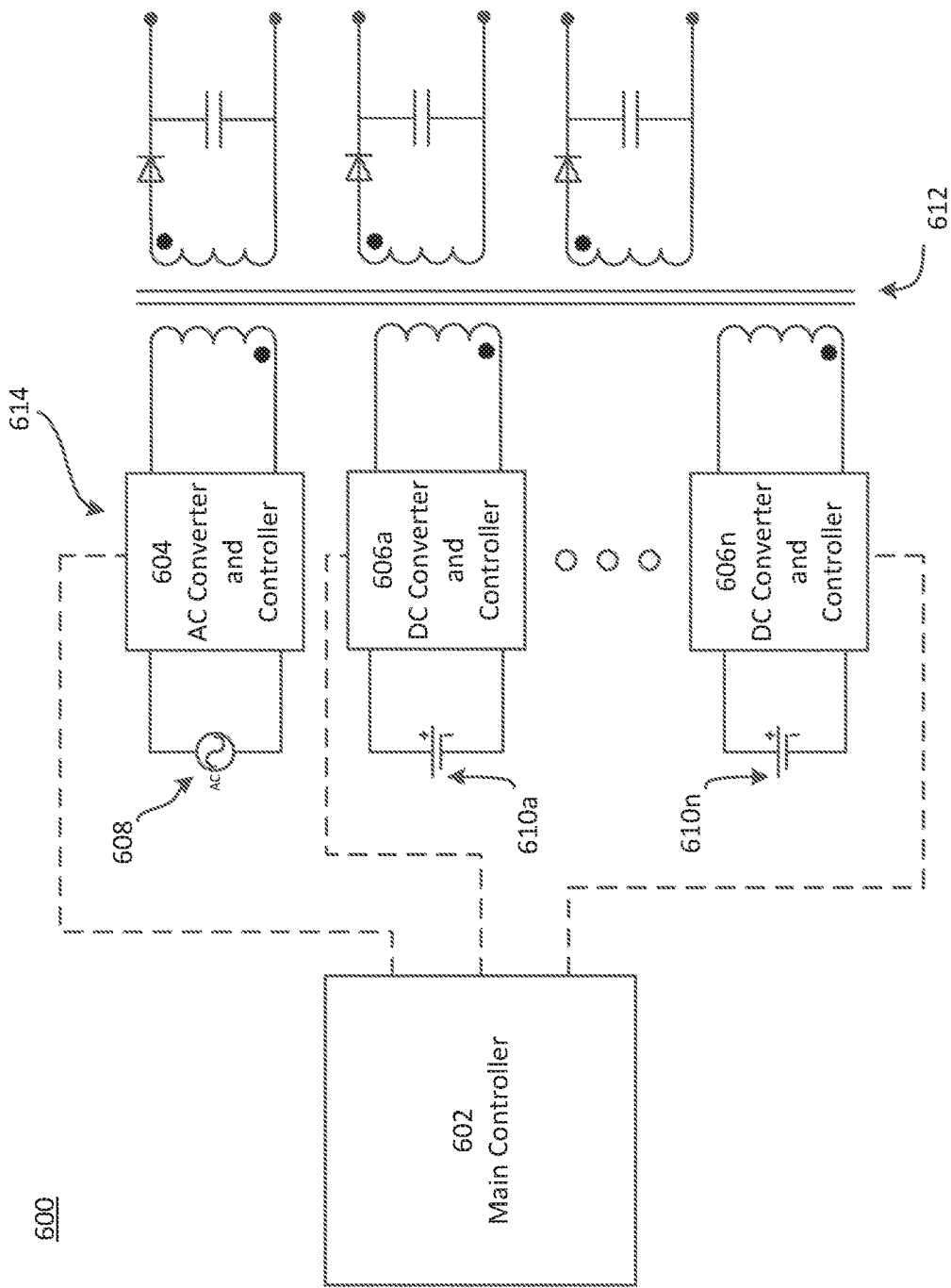
FIG. 6A is a block diagram of a power supply system according to aspects described herein.

For example, FIG. 6A illustrates a power supply system having a control architecture 600 according to one embodiment. The control architecture 600 includes a main controller 602, a transformer 612, and a plurality of converters and controllers 614. In at least one embodiment, the plurality of converters and controllers 614 includes an AC converter and controller 604 and a plurality of DC converters and controllers 606a-606n. The AC converter and controller 604 is coupled to an AC source 608, and to a respective winding of a transformer 612. Each DC converter and controller of the plurality of DC converters and controllers 606a-606n is coupled to a respective DC battery of a plurality of DC batteries 610a-610n, and to a respective winding of the transformer 612. FIG. 6A illustrates one example of a contemplated architecture, and it is to be appreciated that the plurality of converters and controllers 614 can include any number of AC converters and controllers and any number of DC converters and controllers.

The main controller 602 is configured to collect information from the plurality of converters and controllers 614 and, based on the collected information, communicate an enablement signal to at least one converter and controller of the plurality of converters and controllers 614. For example, the main controller 602 can collect information such as input voltage information, output voltage information, remaining battery life information, current readings from a current transformer, and other power information to determine which converter and controller of the plurality of converters and controllers 614 to enable, as discussed in greater detail below with respect to FIG. 7. Responsive to receiving an enablement signal, a selected converter and controller (e.g., the DC converter and controller 606a) can modulate power received from a respective power source (e.g., the DC battery 610a) and, utilizing the modulated power, generate a voltage across a respective winding of the transformer 612.

Figure 6B:
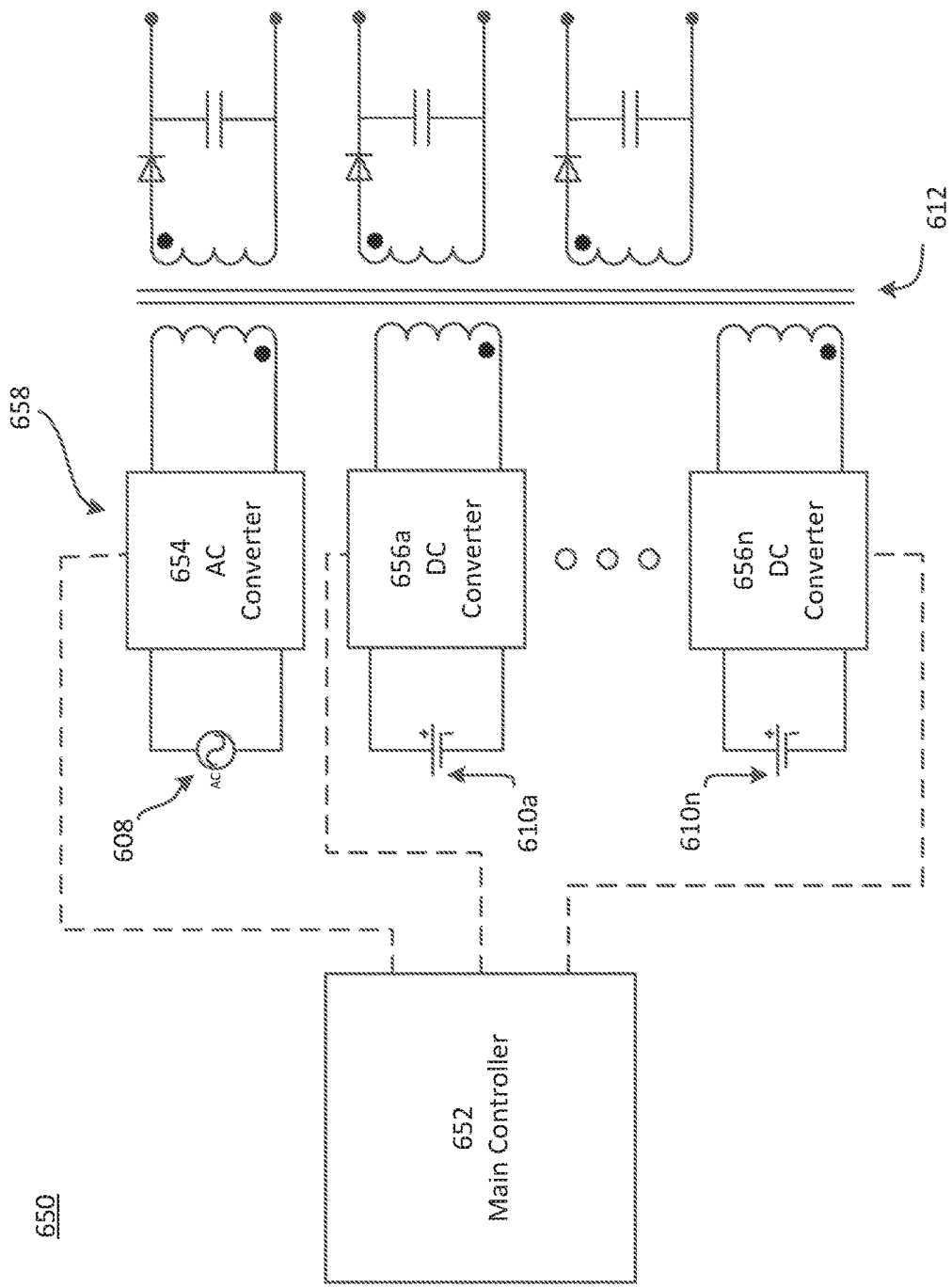
FIG. 6B is a block diagram of a power supply system according to aspects described herein.

FIG. 6B illustrates a power supply system having a control architecture 650 according to one embodiment. The control architecture 650 includes a main controller 652, the transformer 612, and a plurality of converters 658. The plurality of controllers 658 includes an AC converter 654 and a plurality of DC converters 656a-656n.

The control architecture 650 is substantially identical to the control architecture 600 shown in FIG. 6A, except that the plurality of converters and controllers 614 is replaced with the plurality of converters 658 and the operation of the main controller 652 differs from that of the main controller 602. Rather than having a dedicated controller for each individual converter coupled to the main controller 602, the plurality of converters 658 is directly controlled by the main controller 652. For example, the main controller 652 may be configured to directly drive one or more switches in the plurality of converters 658 by communicating PWM signals to the one or more switches. The main controller 652 is configured to collect power information from the plurality of converters 658 and, similar to the main controller 602 determining which of the plurality of converters and controllers 614 to enable based on the collected power information, determines which converter of the plurality of converters 658 to drive.

Figure 7:
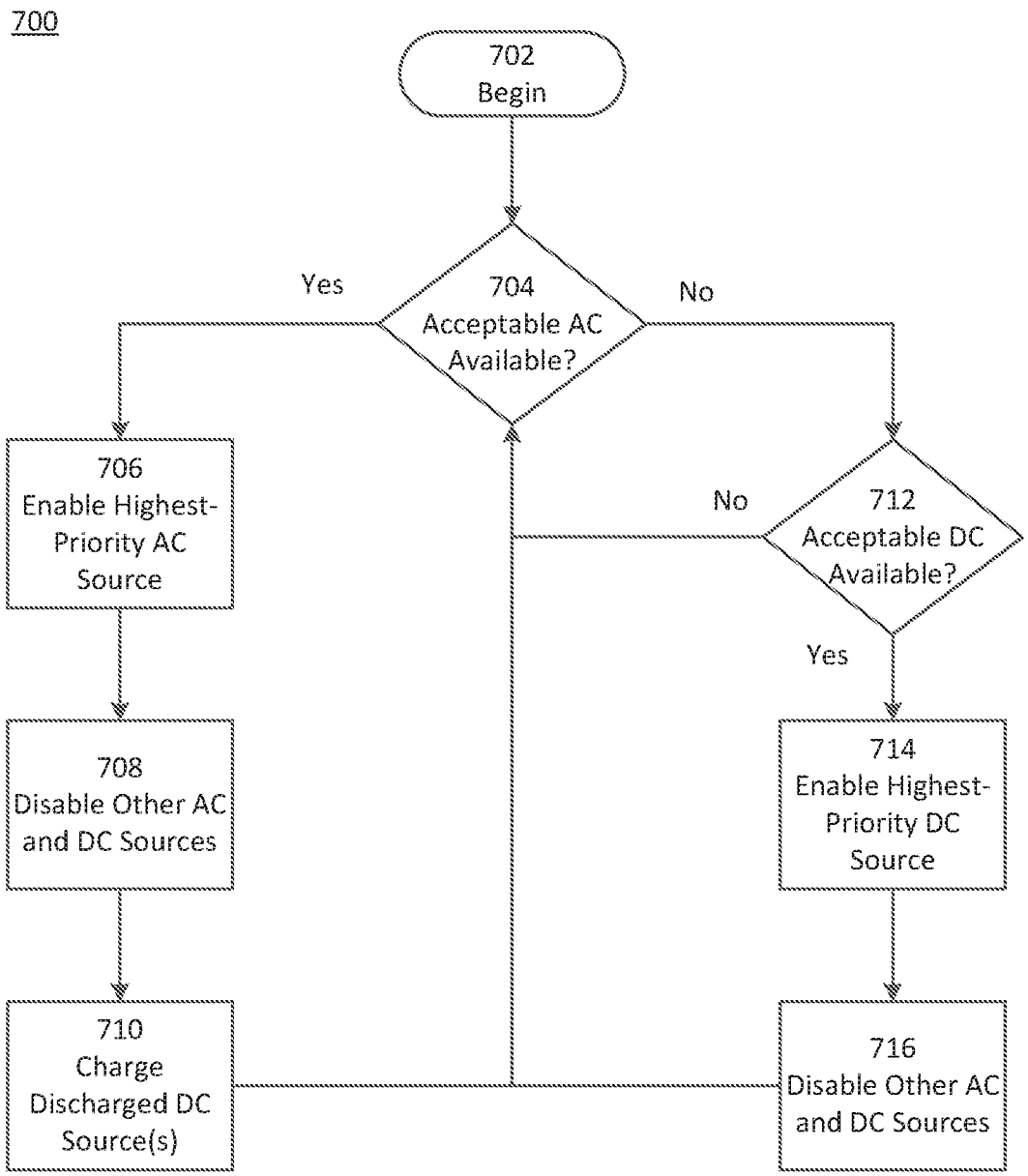
FIG. 7 is a flow chart illustrating a process of operating a power supply system according to aspects described herein.

FIG. 7 illustrates a process 700 for selecting a power source to provide power to a transformer. For example, the transformer can be the transformer 502 discussed above with respect to FIG. 5 or the transformer 612 discussed above with respect to either of FIG. 6A or 6B, and the power source can be any one of the AC power source 404, the DC battery 406, the AC power source 608, or any one of the plurality of DC batteries 610a-610n. The process 700 is applicable to any of the power supply system 400, the control architecture 600, and the control architecture 650, and may be executed by the controller 428, the main controller 602, or the main controller 652.

The process 700 includes acts of evaluating the available AC power, enabling a highest-priority AC source if the AC power is acceptable, disabling other AC and DC sources, charging any discharged DC sources and, if the AC power is unacceptable, evaluating the available DC power, enabling a highest-priority DC source if DC power is acceptable, disabling other AC and DC sources, and repeating the foregoing acts.

At act 702, the process 700 begins. At act 704, an evaluation is made as to whether acceptable AC power is available (e.g., from the AC power source 608). If acceptable AC power is available (704 YES), the process 700 continues to act 706. At act 706, the highest-priority AC source having access to acceptable AC power is enabled. For example, where a plurality of AC sources are provided, each having access to acceptable AC power, a priority hierarchy may be established to set an order in which the plurality of AC sources is enabled. The hierarchy may be pre-established, or determined in real time. Where only one AC source is provided, the sole AC source is automatically the highest-priority AC source. Enabling the AC source may also refer to providing PWM signals directly to switches in a converter associated with the AC source depending on the control architecture being implemented.

At act 708, any other AC and DC sources are disabled, as only one power processing channel is active at any one time. Accordingly, while the highest-priority AC source having access to acceptable AC power is enabled, all other AC and DC sources are disabled from providing power. In alternate embodiments, multiple AC and DC sources may be operated concurrently.

The DC source or sources are still capable of being charged when they are not providing power. Accordingly, at act 710, the enabled AC source charges any discharged DC sources.

Discharged DC sources can include partially- or completely-discharged DC sources. In some examples, the enabled AC source may charge all of the DC sources without evaluating the charge level of the DC sources. In other examples, the enabled AC source may charge all of the DC sources even if one or more of the DC sources is fully charged. For example, the enabled AC source can provide a trickle charging current to maintain the charged DC sources in a fully-charged state.

The process 700 returns to act 704 to evaluate whether acceptable AC power is available. If so (704 YES), acts 706-710 are repeated. If not (704 NO), the process 700 continues to act 712. At act 712, an evaluation is made as to whether acceptable DC power is available. For example, an evaluation can be made as to whether any DC source is at least partially charged. If acceptable DC power is not available (712 NO), the process 700 returns to act 704. If acceptable DC power is available (712 YES), the process 700 continues to act 714.

At act 714, a highest-priority DC source is enabled. For example, where a plurality of DC sources are provided, each having access to acceptable DC power, a priority hierarchy may be established to set an order in which the plurality of DC sources is enabled. The hierarchy may be pre-established, or determined in real time. At act 716, all other AC and DC sources are disabled. As discussed above, only one power processing channel is active at any one time. Accordingly, while the highest-priority DC source having access to acceptable DC power is enabled, all other AC and DC sources are disabled from providing power. Where only one DC source is provided, the sole DC source is automatically the highest-priority DC source. The process 700 then returns to act 704. In alternate embodiments, multiple AC and DC sources may provide power concurrently.

The foregoing disclosure makes reference to a single main controller controlling a power supply system. For example, FIGS. 6A and 6B illustrate a single main controller 602 and a single main controller 652, respectively, configured to control a plurality of converters and controllers 614 and a plurality of converters 658, respectively. In alternate embodiments, however, a plurality of main controllers can be implemented in a single system.

Figure 8:
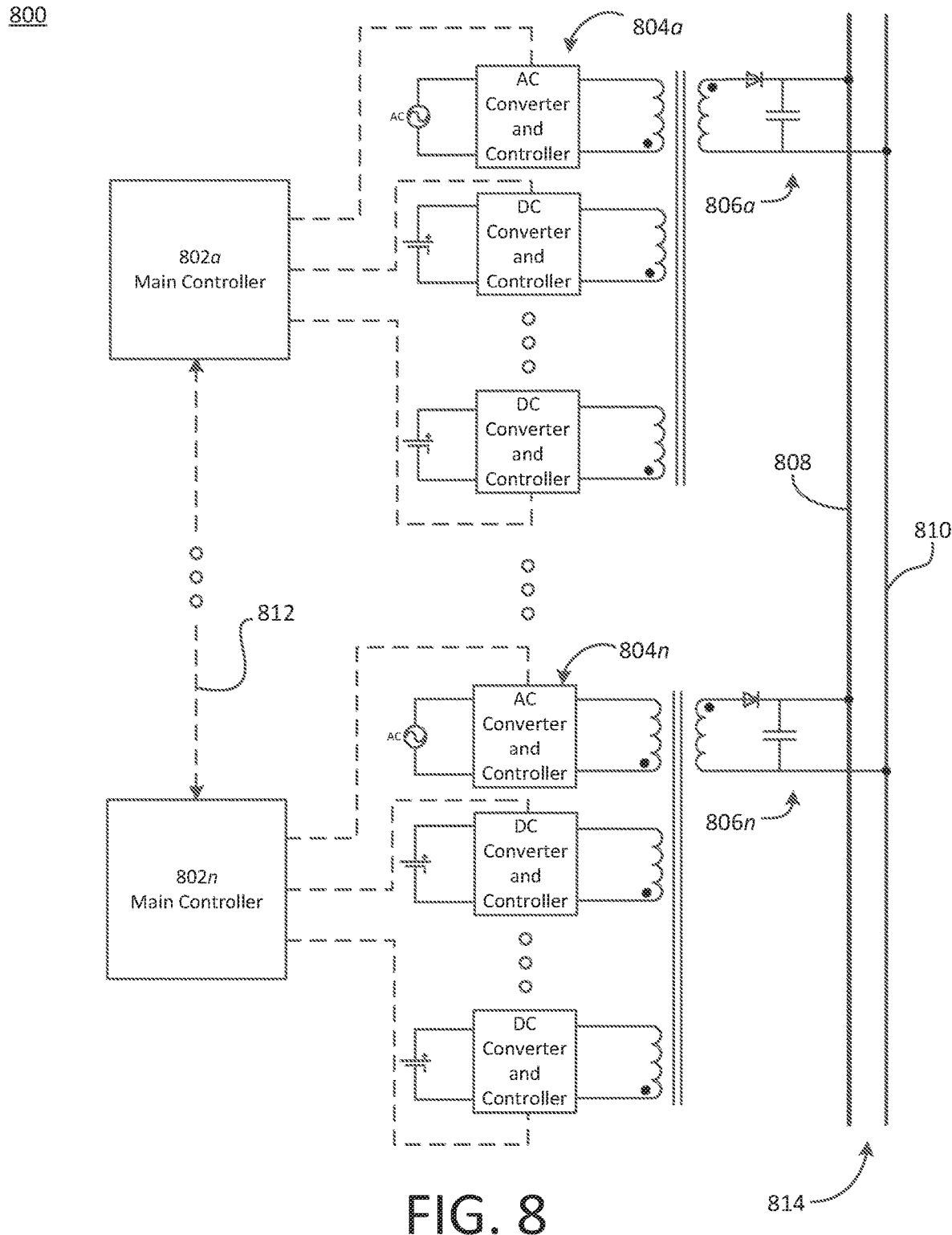
FIG. 8 is a block diagram of a power supply system according to aspects described herein.

For example, FIG. 8 illustrates a power supply system 800 including multiple main controllers according to an embodiment. The power supply system 800 includes a plurality of main controllers 802a-802n, each coupled to a group of converters and controllers (e.g., a group 804*a*) of a plurality of groups of converters and controllers 804*a*-804*n* configured to provide power to the plurality of outputs 806*a*-806*n*. Each output of the plurality of outputs 806*a*-806*n* is, in turn, coupled to a load bus 814 including a high-side line 808 and a low-side line 810.

The main controllers 802*a*-802*n* are configured to be communicatively coupled to one another via a communication channel 812 which may be, for example, a wired communication channel (e.g., an Ethernet channel), a wireless communication channel (e.g., an Internet channel), or a combination of both. Each pair of main controllers may communicate via a dedicated communication channel, or all of the main controllers may communicate via a shared communication channel.

The main controllers 802*a*-802*n* communicate to exchange power supply information. For example, if a DC battery associated with one of the main controllers 802*a*-802*n* fails, the associated main controller can communicate the information to the other main controllers to notify the other main controllers about a loss in power provision from the DC battery.

Although each group of the plurality of groups of converters and controllers 804*a*-804*n* includes a dedicated controller, in other embodiments a respective main controller of the plurality of main controllers 802*a*-802*b* can control a plurality of converters without dedicated controllers as discussed above with respect to FIG. 6B. For example, each main controller of the plurality of main controllers 802*a*-802*b* can be configured to provide PWM signals directly to switches coupled to the main controller.

For purposes of simplicity, a single load bus 814 is illustrated, where the load bus 814 is configured to support power of a first voltage level (e.g., 5 V, 12 V, 24 V, etc.). The plurality of converters and controllers 804*a*-804*n* is configured to provide power of the first voltage level to the load bus 814 in parallel. In alternate embodiments, however, multiple load buses can be included in a single power supply system, and each group of the plurality of groups of converters and controllers 804*a*-804*n* can be configured to provide power to several outputs collectively having various voltage levels. Furthermore, in some examples the plurality of converters and controllers 804*a*-804*n* can be configured to be coupled to one or more shared power sources, as discussed below with respect to FIGS. 9A and 9B.

Figure 9A:
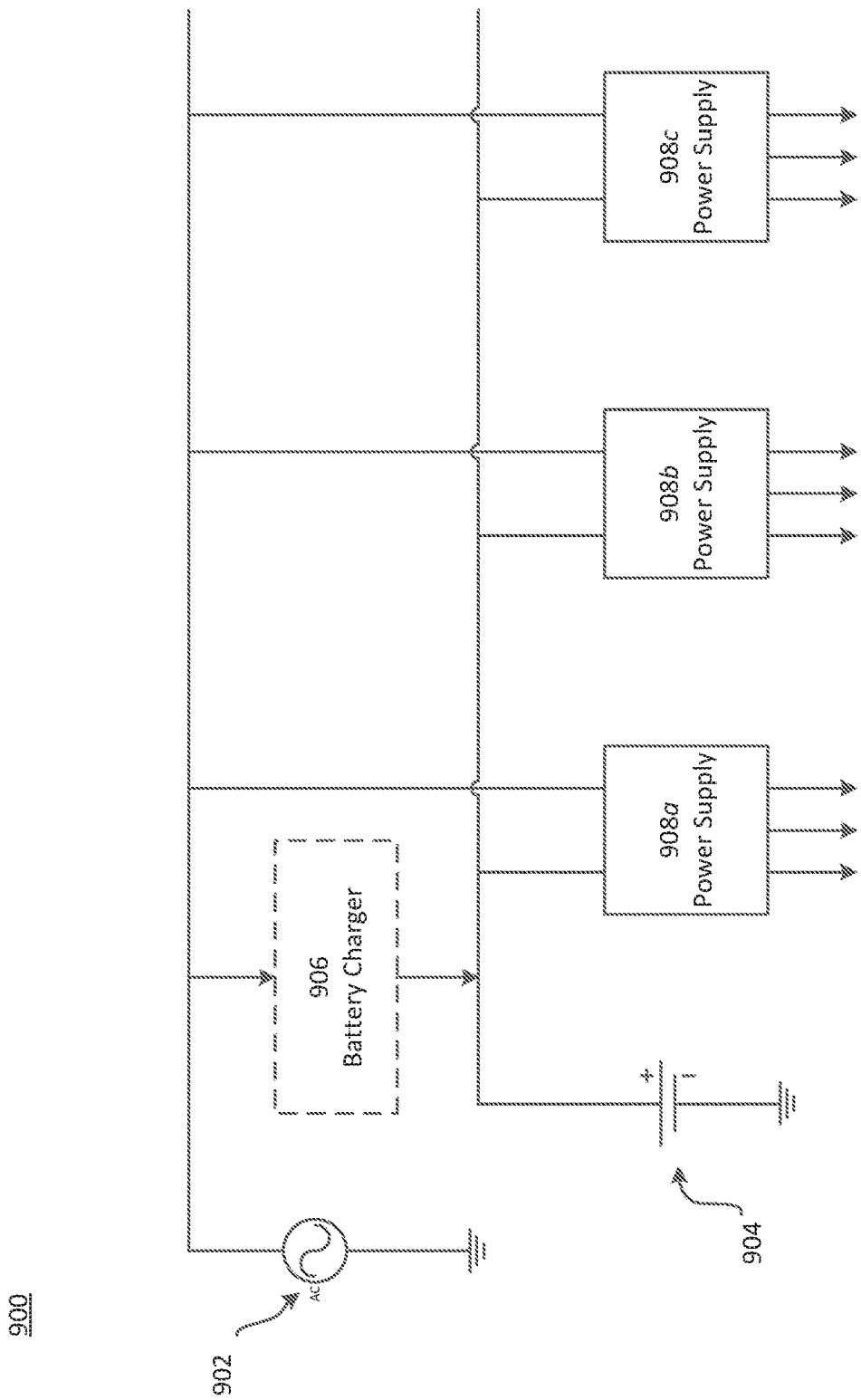
FIG. 9A is a block diagram of a power supply system according to aspects described herein.

FIG. 9A illustrates a first implementation architecture 900 for a plurality of power supply systems. The architecture 900 includes an AC source 902, a DC battery 904, a battery charger 906, and a plurality of power supplies 908*a*, 908*b*, and 908*c*. Each of the power supplies 908*a*-908*c* is coupled to the AC source 902 and the DC battery 904, and includes a plurality of outputs. In some examples, one or more of the power supplies 908*a*-908*c* can be implemented as the power supply 400 discussed above with respect to FIG. 4.

In some examples, the battery charger 906 is configured to charge the DC battery 904 with power derived from the AC source 902. In alternate embodiments, the battery charger 906 can be omitted. For example, the DC battery 906 can be charged through alternate means, or the DC battery 906 may be a one-time-use, disposable battery that is replaced after being discharged.

Figure 9B:
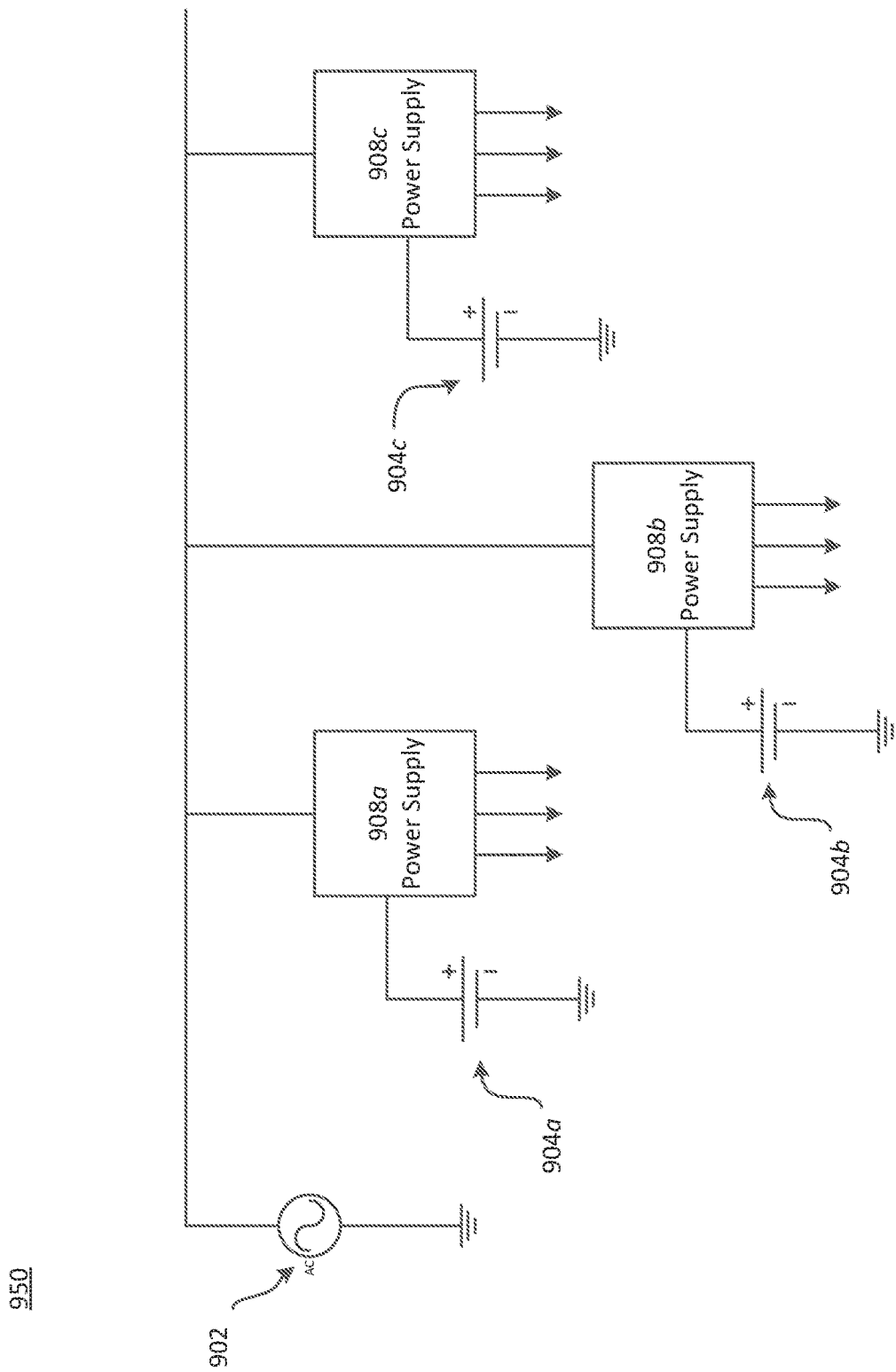
FIG. 9B is a block diagram of a power supply system according to aspects described herein.

FIG. 9B illustrates a second implementation architecture 950 for a plurality of power supply systems. The architecture 950 includes the AC source 902, a plurality of DC batteries 904*a*, 904*b*, and 904*c*, and the plurality of power supplies 908*a*-908*c*. The second implementation architecture 950 is similar to the first implementation architecture 900, except that each of the plurality of power supplies 908*a*-908*c* is coupled to a respective DC battery of the plurality of DC batteries 904*a*-904*c*. In some examples, one or more of the power supplies 908*a*-908*c* can be implemented as the power supply 400 discussed above with respect to FIG. 4.

In some examples, each of the plurality of power supplies 908*a*-908*c* includes an internal battery charger configured to charge a DC battery coupled to a respective power supply using power derived from the AC source 902. In other examples, the AC source 902 can be coupled directly to one or more battery chargers configured to charge the plurality of DC batteries 904*a*-904*c*. In still other examples, one or more of the plurality of DC batteries 904*a*-904*c* can be a one-time-use, disposable battery that is replaced after being discharged.

The outputs of the plurality of power supplies 908*a*-908*c* with respect to either FIG. 9A or 9B can be configured to be coupled in parallel. For example, where two or more of the plurality of power supplies 908*a*-908*c* output power having a substantially identical voltage level (e.g., 5 V, 12 V, 24 V, or any other voltage level), the outputs thereof can be coupled to a common load bus, such as the load bus 814 discussed above.

Various aspects and functions described herein, such as those discussed above with respect to one or more of the main controllers, may be included as specialized hardware or software components executing in one or more computer systems. One or more acts of the method described above may be performed with a computer, where at least one act is performed in a software program housed in a computer. Non-limiting examples of computer systems include, among others, network appliances, personal computers, workstations, mainframes, networked clients, servers, media servers, application servers, database servers and web servers.

Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 10:
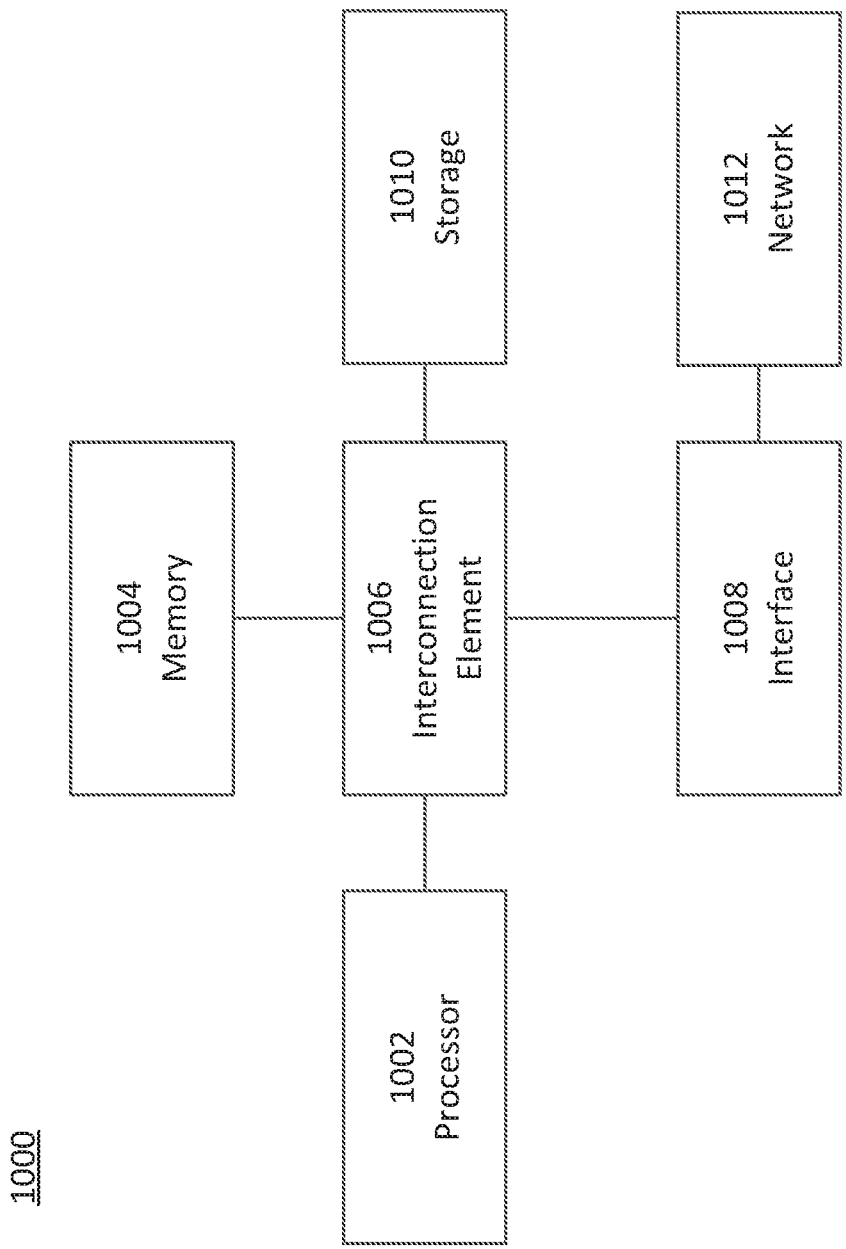
FIG. 10 is a block diagram of a conventional computer system.

Referring to FIG. 10, there is illustrated a block diagram of a computer system 1000, in which various aspects and functions are practiced. As shown, the computer system 1000 includes a processor 1002, one or more memory elements 1004, an interconnection element 1006, one or more interface devices 1008 coupled to a communication network 1012, and a data storage element 1010. As shown, the computer system 1000 is connected to, and may exchange data through, the communication network 1012. The communication network 1012 may include any communication network through which computer systems may exchange data. To exchange data using the communication network 1012, the computer system 1000 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer system 1000 may transmit data via the communication network 1012 using a variety of security measures including, for example, TLS, SSL or VPN.

To implement at least some of the aspects, functions and processes disclosed herein, the processor 1002 performs a series of instructions that result in manipulated data. The processor 1002 may be any type of processor, multiprocessor or controller. Some example processors include commercially available processors such as an Intel Atom, Itanium, Core, Celeron, or Pentium processor, an AMD Opteron processor, an Apple A4 or A5 processor, a Sun UltraSPARC or IBM Power5+ processor and an IBM mainframe chip. The processor 1002 is connected to other system components, including the one or more memory elements 1004, by the interconnection element 1006.

The one or more memory elements 1004 store programs and data during operation of the computer system 1000. Thus, the one or more memory elements 1004 may be relatively high performance, volatile, random access memory such as dynamic random access memory ("DRAM") or static memory ("SRAM"). However, the one or more memory elements 1004 may include any device for storing data, such as a disk drive or other nonvolatile storage device. Various examples may organize the one or more memory elements 1004 into particularized and, in some cases, unique structures to perform the functions disclosed herein. These data structures may be sized and organized to store values for particular data and types of data.

Components of the computer system 1000 are coupled by an interconnection element such as the interconnection element 1006. The interconnection element 1006 may include one or more physical busses, for example, busses between components that are integrated within a same machine, but may include any communication coupling between system elements including specialized or standard computing bus technologies such as IDE, SCSI, PCI and InfiniBand. The interconnection element 1006 enables communications, such as data and instructions, to be exchanged between system components of the computer system 1000.

The computer system 1000 also includes the one or more interface devices 1008 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, and so forth. Interface devices allow the computer system 1000 to exchange information and to communicate with external entities, such as users and other systems.

The data storage element 1010 includes a computer readable and writeable nonvolatile, or non-transitory, data storage medium in which instructions are stored that define a program or other object that is executed by the processor 1002. The data storage element 1010 also may include information that is recorded, on or in, the medium, and that is processed by the processor 1002 during execution of the program. More specifically, the information may be stored in one or more data structures specifically configured to conserve storage space or increase data exchange performance. The instructions may be persistently stored as encoded signals, and the instructions may cause the processor 1002 to perform any of the functions described herein. The medium may, for example, be optical disk, magnetic disk or flash memory, among others. In operation, the processor 1002 or some other controller causes data to be read from the nonvolatile recording medium into other memory, such as the one or more memory elements 1004, that allows for faster access to the information by the processor 1002 than does the storage medium included in the data storage element 1010. The memory may be located in the data storage element 1010 or in the one or more memory elements 1004, however, the processor 1002 manipulates the data within the memory, and then copies the data to the storage medium associated with the data storage element 1010 after processing is completed. A variety of components may manage data movement between the storage medium and other memory elements and examples are not limited to particular data management components. Further, examples are not limited to a particular memory system or data storage system.

Although the computer system 1000 is shown by way of example as one type of computer system upon which various aspects and functions may be practiced, aspects and functions are not limited to being implemented on the computer system 1000. Various aspects and functions may be practiced on one or more computers having a different architectures or components than that shown in FIG. 10. For instance, the computer system 1000 may include specially programmed, special-purpose hardware, such as an application-specific integrated circuit ("ASIC") tailored to perform a particular operation disclosed herein. While another example may perform the same function using a grid of several computing devices running MAC OS X with IBM PowerPC processors and several specialized computing devices running proprietary hardware and operating systems.

The computer system 1000 may be a computer system including an operating system that manages at least a portion of the hardware elements included in the computer system 1000. In some examples, a processor or controller, such as the processor 1002, executes an operating system. Examples of a particular operating system that may be executed include a Windows-based operating system, such as the Windows 8 operating system, available from the Microsoft Corporation, a MAC OS X operating system or an iOS operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system. The processor 1002 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++ or Python. Thus, the examples are not limited to a specific programming language and any suitable programming language could be used. Accordingly, the functional components disclosed herein may include a wide variety of elements, e.g. specialized hardware, executable code, data structures or objects, which are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

The principles disclosed herein may be implemented in any of a variety of applications where DC power is required. For example, the principles disclosed herein can be implemented as server power supplies. Although conventional solutions may use centralized UPSs to provide power to all servers in a rack, the solutions discussed herein can be implemented within a server. The reduced physical footprint of this solution results in a higher-power-density and lower-cost solution as compared to conventional solutions.

The solutions discussed herein can also be implemented in a power supply architecture including a plurality of Power Supply Units (PSUs) having outputs connected in parallel, the plurality of PSUs being coupled to a common battery. The PSUs in the discussed architecture can be replaced by, or combined with, the power supplies discussed herein, such as the power supply 400.

Figure 11:
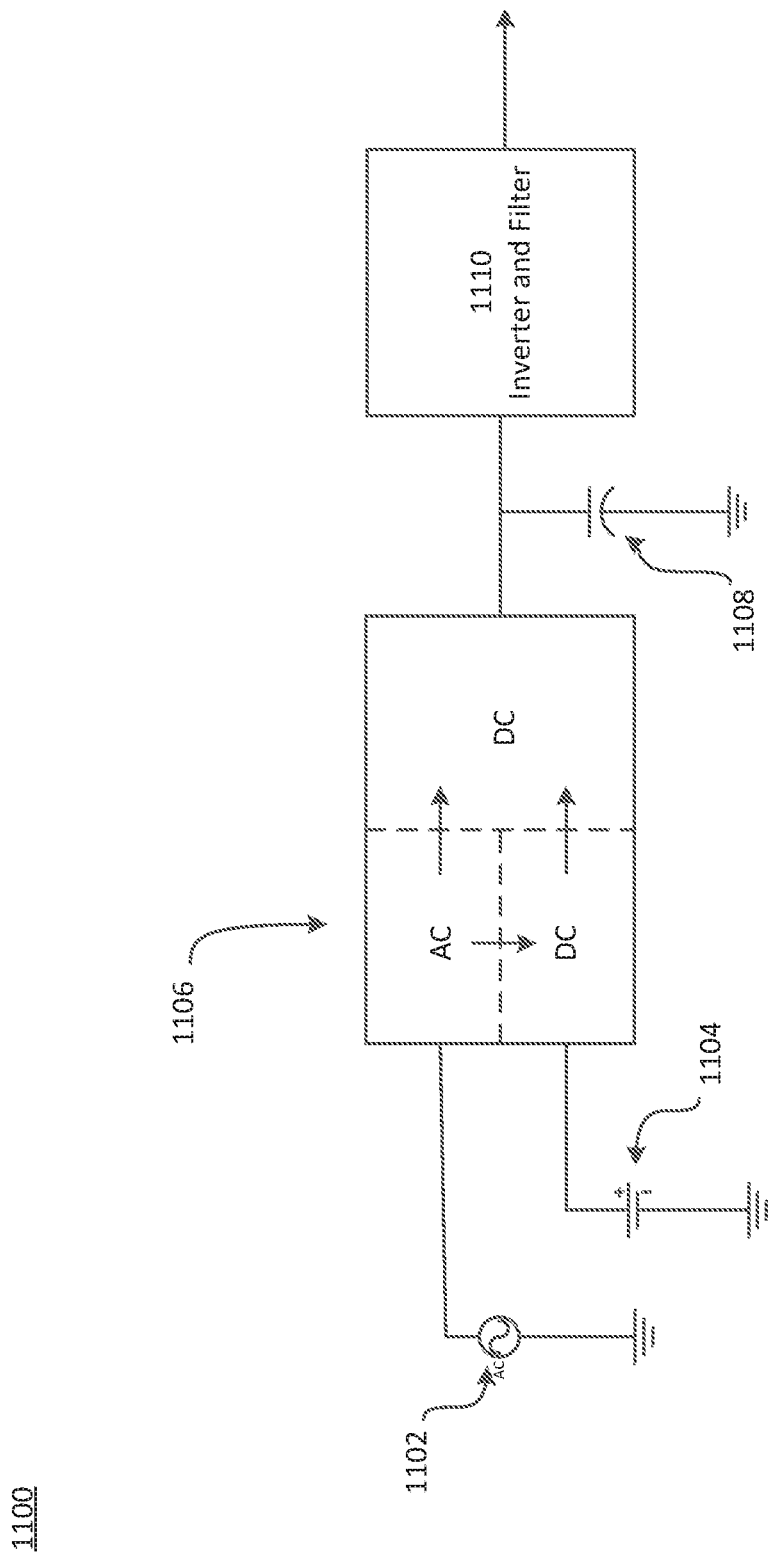
FIG. 11 is a block diagram of an online UPS according to aspects described herein.

The solutions discussed herein can also form the core architecture of an online UPS system. For example, FIG. 11 illustrates a block diagram of a low-cost UPS 1100 implementing the concepts discussed herein. The UPS 1100 includes an AC source 1102, a DC battery 1104, a power supply 1106, a capacitor 1108, and an inverter and filter 1110. The power supply 1106 could be implemented as the power supply 400 discussed above. The capacitor 1108 can be implemented as an electrolytic capacitor to smooth output ripple and ensure uninterrupted power supply without any hold-up time.

The solutions provided herein offer a simple, reliable system for providing backed-up, power-factor-corrected power in a plurality of environments, including automation panels, power supply systems, and data centers, and so forth. These benefits can be achieved at a lower cost than conventional solutions, while increasing power densities.

Various alterations, modifications, and improvements to the principles of this disclosure will readily occur to any skilled in the art. Such alterations, modifications, and improvements are intended to be part of this disclosure, and are intended to be within the spirit and scope of the invention. Accordingly, the foregoing description and drawings are by way of example only.

What is claimed is:

1. A DC power supply, the power supply comprising:
   a first input configured to be coupled to an AC power source;
   a plurality of second inputs, each second input being configured to be coupled to a respective battery of a plurality of batteries;
   an output;
   a transformer including:
      a first winding configured to be coupled to the first input;
      a plurality of second windings, each second winding being configured to be coupled to a respective battery of the plurality of batteries via a respective second input of the plurality of second inputs; and
      a third winding configured to be coupled to the output; and
   a controller coupled to the transformer, wherein the controller is configured to:
      control, in a first mode of operation, the first winding to generate, based on power received from the AC power source, a first voltage across each second winding of the plurality of second windings to charge one or more batteries of the plurality of batteries, and a second voltage across the third winding; and
      control, in a second mode of operation, at least one second winding of the plurality of second windings to generate, based on power received from a respective battery of the plurality of batteries, a third voltage across the third winding.

2. The DC power supply of claim 1, further comprising a plurality of flyback converters, each respective flyback converter being coupled to a respective second input of the plurality of second inputs and coupled to a respective second winding of the plurality of second windings.

3. The DC power supply of claim 2, wherein each flyback converter includes a respective switch coupled to the controller and coupled in series with the respective second winding.

4. The DC power supply of claim 3, wherein the controller is further configured to:
   determine a current through the respective second winding and the respective switch; and
   generate a current feedback signal indicative of the sensed current.

5. The DC power supply of claim 4, wherein the controller is configured to operate, in the second mode of operation, the respective switch to control the current through the respective second winding to generate the third voltage across the third winding.

6. The DC power supply of claim 5, wherein the controller is configured to operate the respective switch to control the current through the respective second winding to generate the third voltage across the third winding based on the current feedback signal.

7. The DC power supply of claim 1, further comprising a plurality of first windings, each first winding of the plurality of first windings being configured to be coupled to a respective AC power source.

8. The DC power supply of claim 1, further comprising a switch coupled to the controller and coupled in series with the first winding, wherein the controller is configured to:
  sense, in the first mode of operation, a first parameter indicative of the first voltage and a second parameter indicative of the second voltage; and
  operate, in the first mode of operation based on the first and second parameters, the switch to control current through the first winding to generate the first voltage, generate the second voltage, and provide power factor correction at the first input.

9. A method of supplying DC power to a load, the method comprising:
  receiving, by a first winding of a transformer in a first mode of operation, AC power from an AC power source;
  providing, by at least one second winding of a plurality of second windings of the transformer in the first mode of operation, a first portion of DC power derived from the AC power to at least one respective battery of a plurality of batteries coupled to the transformer;
  providing, by a third winding of the transformer in the first mode of operation, a second portion of the DC power derived from the AC power to an output;
  receiving, by one or more second windings of the plurality of second windings of the transformer in a second mode of operation, DC power from one or more respective batteries at least one battery of the plurality of batteries; and
  providing, by the third winding of the transformer in the second mode of operation, output power derived from the DC power to the output.

10. The method of claim 9, further comprising determining, in the second mode of operation, a property of the DC power received from the one or more respective batteries at least one battery.

11. The method of claim 10, further comprising generating, based on the determined property of the DC power received from the one or more respective batteries at least one battery, a feedback signal indicative of the DC power received from the one or more respective batteries at least one battery.

12. The method of claim 11, further comprising controlling, in the second mode of operation, the DC power received by the one or more second windings of the transformer based on the feedback signal.

13. The method of claim 12, wherein controlling, in the second mode of operation, the DC power received by the one or more second windings of the transformer includes controlling an output voltage of the output power provided to the output.

14. The method of claim 9, wherein providing, in the first mode of operation, the first portion of the DC power derived from the AC power to the at least one respective battery includes providing the first portion of the DC power derived from the AC power to the plurality of batteries.

15. The method of claim 9, further comprising:
  determining, in the first mode of operation, a first parameter indicative of the first portion of the DC power and a second parameter indicative of the second portion of the DC power;
  modulating, in the first mode of operation, the first portion of the DC power and the second portion of the DC power based on the first parameter and the second parameter; and
  providing, in the first mode of operation, power factor correction at an input receiving the AC power.

16. The method of claim 9, wherein receiving, in the first mode of operation, the AC power from the AC power source includes receiving the AC power from a plurality of AC power sources.

17. The method of claim 9, further comprising selecting, in the first mode of operation, a highest-priority AC source of the AC power source from which to receive the AC power, and selecting, in the second mode of operation, at least one highest-priority DC source from the plurality of batteries from which to receive the DC power.

18. A DC power supply, the power supply comprising:
  a first input configured to be coupled to an AC power source;
  a plurality of second inputs, each second input being configured to be coupled to a respective battery of a plurality of batteries;
  an output; and
  means for providing, in a first mode of operation, a first winding of a transformer to generate, based on AC power received from the AC power source, a first voltage across each winding of a plurality of second windings of the transformer to charge at least one battery of the plurality of batteries, and a second voltage across a third winding of the transformer, and for controlling, in a second mode of operation, the plurality of second windings to generate, based on power received from the plurality of batteries, a third voltage across the third winding.

19. The DC power supply of claim 18, further comprising the plurality of second windings, each second winding of the plurality of second windings being coupled to respective means for enabling, in the second mode of operation, each second winding to generate, based on power received from a respective battery, the third voltage across the third winding.

* * * * *

UNITED STATES PATENT AND TRADEMARK OFFICE
CERTIFICATE OF CORRECTION

| | |
|---|---|
| PATENT NO. | : 11,056,909 B2 |
| APPLICATION NO. | : 16/025285 |
| DATED | : July 6, 2021 |
| INVENTOR(S) | : Ghosh et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 267 days.

This patent is subject to a terminal disclaimer.

Signed and Sealed this
Thirty-first Day of January, 2023

Katherine Kelly Vidal
*Director of the United States Patent and Trademark Office*